United States Patent [19]

Garg

[11] Patent Number: 4,581,443

[45] Date of Patent: Apr. 8, 1986

[54] PRODUCTION OF IMPROVED PELLETS FROM MELT-PROCESSABLE POLYMER WHICH IS CAPABLE OF FORMING AND ANISOTROPIC MELT

[75] Inventor: Sunil K. Garg, Summit, N.J.

[73] Assignee: Celanese Corporation, New York, N.Y.

[21] Appl. No.: 659,209

[22] Filed: Oct. 9, 1984

[51] Int. Cl.$^4$ ............................. C08F 2/00; B28B 1/26
[52] U.S. Cl. .................................... 528/480; 264/101; 264/102; 264/142
[58] Field of Search ...................... 264/101, 102, 142; 528/480

[56] References Cited

U.S. PATENT DOCUMENTS

| | | | |
|---|---|---|---|
| 3,577,360 | 5/1971 | Immel | 264/101 |
| 4,161,470 | 7/1979 | Calundann | 528/190 |
| 4,418,030 | 11/1983 | Muller et al. | 264/14 L |
| 4,447,599 | 5/1984 | Cogswell et al. | 528/486 |
| 4,474,938 | 10/1984 | Richardson | 528/176 |

FOREIGN PATENT DOCUMENTS

| | | | |
|---|---|---|---|
| 50-3350 | 2/1975 | Japan | 264/142 |
| 998063 | 7/1965 | United Kingdom | 264/101 |

*Primary Examiner*—Joseph L. Schofer
*Assistant Examiner*—Peter F. Kulkosky
*Attorney, Agent, or Firm*—Burns, Doane, Swecker & Mathis

[57] ABSTRACT

Improved pellets comprising a melt-processable thermotropic liquid crystalline polymer (e.g., a wholly aromatic polyester) are provided. The molten anisotropic melt-forming polymer, while present as a thin film of the specified thickness at an appropriate temperature, is subjected to reduced pressure conditions whereby residual volatiles are evolved and removed, and the polymer thereby is densified to the specified degree prior to pellet formation. The resulting densified polymer next is melt-extruded and is cut to form pellets while at an appropriate temperature. It surprisingly has been found to be of prime importance that the resulting pellets possess a density of at least 95 percent of the theoretical maximum (e.g., a polymer density of approximately 1.35 to 1.4 gram/cc.) if the advantages of the present invention are to be fully realized. These pellets have been found to be capable of undergoing melt processing to form shaped articles having improved physical properties. For instance, such shaped articles exhibit markedly smoother surface characteristics and can be used at elevated temperatures for extended periods of time while better retaining the desired surface characteristics.

42 Claims, No Drawings

PRODUCTION OF IMPROVED PELLETS FROM MELT-PROCESSABLE POLYMER WHICH IS CAPABLE OF FORMING AND ANISOTROPIC MELT

BACKGROUND OF THE INVENTION

Melt-processable thermotropic polymers which are capable of forming an anisotropic melt phase constitute a recognized class of polymers which is well known in the art. The anisotropic character of the polymer melt may be confirmed by conventional polarized light techniques whereby crossed-polarizers are utilized. More specifically, the anisotropic (i.e., ordered) nature of the melt phase may conveniently be confirmed by the use of a Leitz polarizing microscope at a magnification of 40× with the sample on a Leitz hot stage and under a nitrogen atmosphere. The amount of light transmitted changes when the sample is forced to flow; however, the sample is optically anisotropic even in the static state. On the contrary typical melt-processable polymers do not transmit light to any substantial degree when examined under quiescent conditions and are isotropic in nature.

Following formation in an appropriate reaction zone, the melt-processable thermotropic polymers commonly are melt-extruded and are cut to pellet form with or without the presence of a solid particulate filler and/or reinforcing agent. The resulting polymer may be used to form fibers, films, three-dimensional molded articles, or three-dimensional melt-extruded articles. If the polymer pellets include substantial quantities of a solid particulate filler and/or reinforcing agent, then they tend to be used primarily for forming three-dimensional molded articles and/or three-dimensional melt-extruded articles rather than fibers, as will be apparent to those skilled in the art.

Heretofore, it has been observed that shaped articles formed from thermotropic polymers which are capable of forming an anisotropic melt phase commonly exhibit less than optimum surface characteristics following molding or melt-extrusion. For instance, upon careful examination small blisters or blemishes may be observed on the surface. Also, upon extended heat treatment to improve the strength thereof or usage of an article molded from the same at an elevated temperature (e.g., 200° C.) the surface appearance of the article commonly will become even less uniform.

It is an object of the present invention to provide an improved process for producing pellets from a melt-processable thermotropic polymer which is capable of forming an anisotropic melt phase whereby the resulting pellets are capable of undergoing melt-processing to form shaped articles having improved physical properties.

It is an object of the present invention to provide an improved process for producing pellets from a melt-processable thermotropic polymer which is capable of forming an anisotropic melt phase whereby the resulting pellets are capable of undergoing melt-processing to form shaped articles that have an improved surface appearance.

It is an object of the present invention to provide an improved process for producing pellets from a melt-processable thermotropic polymer which is capable of forming an anisotropic melt phase whereby the resulting pellets are capable of undergoing melt-processing to form improved articles which can be heat-treated for an extended period of time to impart strength improvement while retaining improved surface characteristics.

It is an object of the present invention to provide an improved process for producing pellets from a melt-processable thermotropic polymer which is capable of forming an anisotropic melt phase whereby the resulting pellets are capable of undergoing melt-processing to form improved molded articles which can better withstand extended usage at an elevated temperature while retaining improved surface characteristics.

It is an object of the present invention to provide improved pellets comprising a melt-processable thermotropic polymer which is capable of forming an anisotropic melt phase which pellets can be melt-processed to form shaped articles having improved physical properties.

It is an object of the present invention to provide improved pellets comprising a melt-processable thermotropic polymer which is capable of forming an anisotropic melt phase which pellets can be melt-processed to form shaped articles having an improved surface appearance.

It is another object of the present invention to provide improved pellets comprising a melt-processable thermotropic polymer which is capable of forming an anisotropic melt phase which pellets can be melt-processed via injection-molding and/or melt-extrusion to form improved three-dimensional articles which can be heat-treated for an extended period of time to impart strength improvement while retaining improved surface characteristics.

It is a further object of the present invention to provide improved pellets comprising a melt-processable thermotropic polymer which is capable of forming an anisotropic melt phase which pellets can be melt-processed via injection-molding and/or melt-extrusion to form improved three-dimensional articles which can better withstand extended usage at an elevated temperature while retaining improved surface characteristics.

These and other objects, as well as the scope, nature, and utilization of the claimed invention will be apparent to those skilled in the art from the following detailed description and appended claims.

SUMMARY OF THE INVENTION

It has been found that an improved process for producing pellets from a melt-processable thermotropic polymer which is capable of forming an anisotropic melt phase, which pellets being capable of undergoing melt-processing to form shaped articles having improved physical properties when compared to shaped articles prepared from conventionally prepared pellets which lack the densification treatment of the present invention, comprises:

(a) subjecting the melt-processable thermotropic polymer which is capable of forming an anisotropic melt phase while in the molten state at a temperature below the threshold temperature for further polymerization and present as a thin film in a thickness of no more than approximately 10 mm. to reduced pressure conditions whereby residual volatiles present therein are substantially evolved and removed from the molten polymer whereby the polymer is densified, (b) extruding the resulting densified polymer while molten and at a temperature below its threshold temperature for further polymerization into a quench zone, and (c) cutting the extrudate to form improved solid pellets therefrom having a pellet density of at least 95 percent of the theoretical maximum.

It has been found that an improved pellet which is capable of undergoing melt-processing to form shaped articles having improved physical properties when compared to shaped articles prepared from conventionally prepared pellets of lesser density comprises a melt-processable thermotropic polymer which is capable of forming an anisotropic melt phase, and has a width of approximately 0.0625 to 0.25 inch, a length of approximately 0.0625 to 0.25 inch, and a pellet density of at least 95 percent of theoretical maximum.

DESCRIPTION OF PREFERRED EMBODIMENTS

The starting polymeric material which is utilized in the process of the present invention is capable of forming an anisotropic melt phase (i.e., is capable of exhibiting liquid crystalline properties) and may be formed by conventional techniques. Such melt-processable thermotropic polymer when pelletized will commonly possess a pellet density of approximately 75 to 93 percent (e.g., approximately 80 to 90 percent) of the theoretical maximum. For instance, starting polymer densities of approximately 1.0 to 1.30 gram/cc. commonly are observed, while the theoretical maximum pellet density for an uncompounded polymer will be on the order of 1.40 gram/cc. in most instances when determined as described hereafter. It has been found that such relatively low polymer densities for the starting material will be routinely exhibited by the starting anisotropic melt-forming polymer even if the polymer were subjected to a reduced pressure in the polymerization reactor during a final stage of the polymerization reaction.

The starting polymeric material is considered to be "melt-processable" when it exhibits a melting temperature sufficiently below its degradation or decomposition temperature to enable it to undergo extrusion or molding while molten without any significant loss of polymeric integrity (e.g., chain length, etc.).

Representative classes of polymers from which the melt-processable thermotropic polymer suitable for use in the present invention may be selected include wholly aromatic polyesters, aromatic-aliphatic polyesters, wholly aromatic poly(ester-amides), aromatic-aliphatic poly(ester-amides), aromatic polyester-carbonates, and mixtures of the same. In preferred embodiments the melt-processable thermotropic polymer is a wholly aromatic polyester, or a wholly aromatic poly(ester-amide). A polymer is considered to be "wholly aromatic" when each moiety present within the polymer chain contributes at least one aromatic ring. Also, it is preferred that naphthalene moieties be included in the melt-processable thermotropic polymer in a concentration of not less than 10 mole percent. Representative naphthalene moieties are 6-oxy-2-naphthoyl moiety; 2,6-dioxy-naphthalene moiety, 2,6-dicarboxynaphthalene moiety, and mixtures thereof. The particularly preferred naphthalene moiety for inclusion in the melt-processable thermotropic liquid crystalline polymer is the 6-oxy-2-naphthoyl moiety in a concentration of not less than about 10 mole percent.

Representative wholly aromatic polyesters which exhibit thermotropic liquid crystalline properties include those disclosed in the following U.S. Pat. Nos. which are herein incorporated by reference: 3,991,013; 3,991,014; 4,066,620; 4,067,852; 4,075,262; 4,083,829; 4,093,595; 4,118,372; 4,130,545; 4,146,702; 4,153,779; 4,156,070; 4,159,365; 4,161,470; 4,169,933; 4,181,792; 4,183,895; 4,184,996; 4,188,476; 4,201,856; 4,219,461; 4,224,433; 4,226,970; 4,230,817; 4,232,143; 4,232,144; 4,238,598; 4,238,599; 4,238,600; 4,242,496; 4,245,082; 4,245,084; 4,247,514; 4,256,624; 4,265,802; 4,267,304; 4,269,965; 4,279,803; 4,294,955; 4,299,756; 4,318,841; 4,335,232; 4,337,190; 4,337,191; 4,347,349; 4,355,134; 4,359,569; 4,360,658; 4,370,466; 4,374,228; 4,374,261; 4,375,530; 4,377,681; and 4,429,100.

Representative aromatic-aliphatic polyesters which exhibit thermotropic liquid crystalline properties are copolymers of polyethylene terephthalate and hydroxybenzoic acid as disclosed in *Polyester X-7G-A Self Reinforced Thermoplastic,* by W. J. Jackson, Jr.; H. F. Kuhfuss; and T. F. Gray, Jr. (30th Anniversary Technical Conference, 1975 Reinforced Plastic Composites Institute, The Society of the Plastics Industry, Inc., Section 17-D, Pages 1–4). A further disclosure of such copolymers can be found in "Liquid Crystal Polymers: I. Preparation and Properties of p-Hydroxybenzoic Acid Copolymers, *Journal of Polymer Science, Polymer Chemistry Edition* (Vol. 14, pages 2043 to 2058 (1976)) by W. J. Jackson, Jr.; and H. F. Kuhfuss. See also commonly assigned U.S. Pat. Nos. 4,318,842 and 4,355,133. These disclosures are herein incorporated by reference.

Representative wholly aromatic and aromatic-aliphatic poly(ester-amides) which exhibit thermotropic liquid crystalline properties are disclosed in U.S. Pat. Nos. 4,272,625; 4,330,457; 4,339,375; 4,341,688; 4,351,917; 4,351,918 and 4,355,132, which are herein incorporated by reference.

Representative aromatic polyester-carbonates which exhibit thermotropic liquid crystalline properties are disclosed in U.S. Pat. Nos. 4,107,143; 4,284,757; and 4,371,660 which are herein incorporated by reference.

In a preferred embodiment of the present invention the melt-processable thermotropic polymer which serves as the starting material is a wholly aromatic polyester as disclosed in commonly assigned U.S. Pat. No. 4,161,470 which is herein incorporated by reference. More specifically, the wholly aromatic polyester consists essentially of moieties I and II wherein:

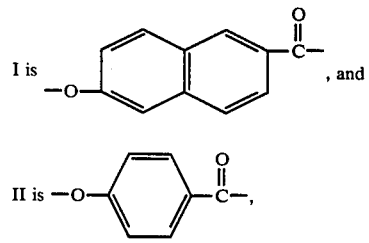

wherein said polyester comprises approximately 10 to 90 mole percent of moiety I, and approximately 10 to 90 mole percent of moiety II. In a particularly preferred embodiment the wholly aromatic polyester comprises approximately 15 to 35 mole percent of moiety I (e.g., approximately 27 mole percent), and approximately 65 to 85 mole percent of moiety II (e.g., approximately 73 mole percent).

In a further preferred embodiment of the present invention the melt-processable thermotropic polymer which serves as the starting material is a wholly aromatic poly(ester-amide) as disclosed in commonly assigned U.S. Pat. No. 4,330,457 which is herein incorporated by reference. More specifically, the wholly aromatic poly(ester-amide) consists essentially of moieties I, II, III, and optionally IV, wherein in each instance Ar comprises at least one aromatic ring, and wherein:

I is

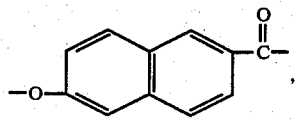

II is

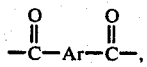

III is —Y—Ar—Z—, where Y is O, NH, or NR, and Z is NH or NR where R is an alkyl group of 1 to 6 carbon atoms or an aryl group, and IV is —O—Ar—O—, wherein said poly(ester-amide) comprises approximately 10 to 90 mole percent of moiety I, approximately 5 to 45 mole percent of moiety II, approximately 5 to 45 mole percent of moiety III, and approximately 0 to 40 mole percent of moiety IV. In a particularly preferred embodiment the wholly aromatic poly(ester-amide) comprises approximately 40 to 80 mole percent of moiety I (e.g., approximately 60 mole percent), approximately 5 to 30 mole percent of moiety II (e.g., approximately 20 mole percent), approximately 5 to 30 mole percent of moiety III (e.g., approximately 20 mole percent), and approximately 0 to 25 mole percent of moiety IV (e.g., approximately 0 mole percent). In a particularly preferred embodiment moiety II is a terephthaloyl moiety, moiety III is a p-aminophenylene moiety, and moiety IV is absent.

The melt-processable thermotropic polymer which is selected as the starting material commonly will have

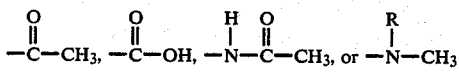

end groups, depending upon the synthesis route selected. As will be apparent to those skilled in the art, the end groups optionally may be capped (e.g., acidic end groups may be capped with a variety of alcohols, and hydroxyl end groups may be capped with a variety of organic acids). For instance, end capping units such as phenylester

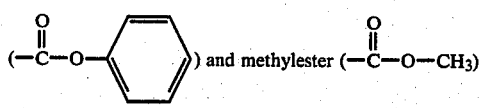

optionally may be included at the end of the polymer chains.

The melt-processable thermotropic polymer which is selected as the starting material may be formed by a variety of previously known techniques whereby organic monomer compounds possessing functional groups, which upon condensation form the requisite recurring moieties, are reacted. For instance, the functional groups of the organic monomer compounds may be carboxylic acid groups, hydroxyl groups, ester groups, acyloxy groups, acid halides, amine groups, etc.

When using preferred polymerization techniques any hydroxyl or amine groups are first provided in a modified form whereby the usual hydroxyl groups and/or amine groups of these monomers are esterified (i.e., they are provided as acyl esters). The lower acyl groups preferably have from about 2 to about 4 carbon atoms. Most preferably the acetate esters of such organic monomers are provided. Since the by-product of the condensation polymerization reaction is an acid, such polymerization commonly is, termed an "acidolysis" polymerization.

The polymerization reaction advantageously may be carried out using a melt-polymerization technique or a slurry-polymerization technique. Satisfactory melt-polymerization techniques to prepare the starting polymeric material are disclosed in commonly assigned U.S. Pat. Nos. 4,161,470 and 4,330,457. In commonly assigned U.S. Pat. No. 4,067,852 of Gordon W. Calundann entitled "Melt Processable Thermotropic Wholly Aromatic Polyester Containing Polyoxybenzoyl Units" is described a slurry-polymerization process which may be employed to form the starting polymeric material wherein the solid product is suspended in a heat-exchange medium. The disclosures of these patents are herein incorporated by reference.

Representative catalysts which optionally may be employed in either the melt-polymerization procedure or in the slurry-polymerization procedure include dialkyl tin oxide (e.g., dibutyl tin oxide), diaryl tin oxide, titanium dioxide, alkoxy titanium silicates, titanium alkoxides, alkali and alkaline earth metal salts of carboxylic acids, the gaseous acid catalysts such as Lewis acids (e.g., $BF_3$), hydrogen halides (e.g., HCl), etc. The quantity of catalyst utilized typically is about 0.001 to 1 percent by weight based upon the total monomer weight, and most commonly about 0.01 to 0.2 percent by weight.

If desired, the starting polymeric material may be formed in accordance with the teachings of commonly assigned U.S. Ser. Nos. 517,865, filed July 27, 1983 (now U.S. Pat. No. 4,539,386); 595,004, filed Mar. 29, 1984; and 611,299, filed May 17, 1984 or Hyun-Nam Yoon which employ imbalanced end group concentrations during the polymerization reaction. Such inherently more thermally stable polymers have been found to nevertheless benefit from the concept of the present invention.

As is known in the art, a partial vacuum may be applied to the reactor during a portion of the polymerization reaction in an effort to remove volatiles.

The melt-processable thermotropic polymer which is selected as the starting material for use in the present invention commonly exhibits an inherent viscosity of at least approximately 1.0 dl./gram (e.g., approximately 0.8 to 15.0 dl./gram) when dissolved in a concentration of 0.1 percent by weight in pentafluorophenol at 60° C. All such polymers formed by prior techniques, regardless of the polymerization technique employed or the molecular weight thereof, can benefit from the densification processing of the present invention. However, the greatest improvement tends to be observed with those polymers of the higher molecular weights (e.g., those which exhibit an inherent viscosity of approximately 3.0 to 12.0 dl./gram) when dissolved in a concentration of 0.1 percent by weight in pentafluorophenol at 60° C.

In accordance with the concept of the present invention the melt-processable thermotropic polymer is subjected to a specifically defined densification treatment which surprisingly has been found to improve its ability to form shaped articles of a significantly better quality. During the course of the densification treatment the melt-processable thermotropic polymer is provided in the molten state as a thin film while at a temperature below the threshold temperature for further polymerization. During this densification relatively small but deleterious quantities of residual volatiles trapped within the polymeric material during prior processing are effectively removed. Such difficult-to-remove volatiles commonly include unreacted monomers, dimers, various by-products of the condensation polymerization reaction, acetic acid, phenol, dissolved carbon dioxide, water, acetic anhydride, phenylacetate, etc.

It has been found to be important that the densification treatment be conducted under conditions whereby no substantial quantity of new or "nascent" volatiles are created within the polymer. Accordingly, the densification treatment primarily involves the removal of relatively small quantities of volatiles which were already inherently present within the starting material. The threshold temperature has been found to be influenced to some degree by the polymer chain length already achieved and the level, nature, and relative quantities of the polymerizable reactive end groups which are present in the polymer. The threshold temperature for further polymerization for a given polymeric starting material conveniently may be determined by high temperature dilatometry. A convenient description of the method can be found in N. Bekkedahl, *Journal of Research of the National Bureau of Standards*, Vol. 49, Pages 145 to 156 (August, 1949). The "threshold temperature for further polymerization" is herein defined as that temperature at which the total measured volumetric increase for the polymer and an inert high temperature fluid (e.g., Dow Corning SYLTHERM 800 fluid) exceeds the sum of the volumetric increases for the polymer and the inert fluid measured separately, at the same temperature with reference to a lower temperature (e.g., ambient temperature of 23° C.). The expected change in volume between the reference temperature and the experimental temperature can be conveniently given in the form:

$$\Delta V = \Delta V(fluid) + \Delta V(polymer)$$

where, $\Delta V$ is the total change in volume, $\Delta V(fluid)$ is the expected change in volume of the inert fluid, and $\Delta V(polymer)$ is the expected change in the volume of the polymer.

The temperature at which $[\Delta V - [\Delta V(fluid) + \Delta V(polymer)]] > 0$ is the threshold temperature referred to herein since the excess change in volume represents the gaseous products of further polymerization initiated in the dilatometric apparatus.

It has been found to be of prime importance that the thickness of the molten melt-processable thermotropic polymer during the densification treatment of the present invention not be great. More specifically, the thickness of the molten melt-processable thermotropic polymer should be no more than about 10 mm., and preferably no more than about 7 mm. Particularly, good results have been achieved when the film thickness measures approximately 1 to 5 mm. (e.g., aproximately 3 mm.). Surface renewal and agitation of the polymer preferably should take place during the densification treatment to promote the ready evolution of entrapped volatiles.

Reduced pressure conditions are caused to impinge upon the thin film of molten polymer in order to cause residual volatiles inherently present therein to be substantially evolved and removed. In a preferred embodiment the pressure which impinges upon the thin film is progressively decreased during the course of the densification treatment since the final portion of the volatiles present therein tends to be more difficult to evolve and to thereby remove. If desired, the molten polymer can be provided in the desired thin film configuration while under the reduced pressure conditions a plurality of times during the course of the densification treatment. The vacuum employed during the densification treatment commonly is approximately 0 to 100 mm. of mercury, and preferably is approximately 0 to 60 mm. of mercury (e.g., approximately 10 mm. of mercury). It will be appreciated, however, that longer treatment times commonly will be associated with the reduced pressures which more closely approach atmospheric pressure. Treatment times to accomplish the desired densification also will be influenced by the level of volatiles inherently present therein. Representative residence times to accomplish the desired densification commonly range from approximately 1 to 10 minutes (e.g., approximately 2 to 5 minutes) while the molten polymeric material is present in the preferred relatively thin film thickness of approximately 3 mm. Longer densification treatment times commonly will be associated with greater film thicknesses and commonly can be practiced without commensurate advantage once the desired level of densification is achieved within the thin film undergoing treatment.

The nature of the equipment employed to accomplish the densification of the melt-processable thermotropic polymer can be varied widely so long as the desired end result is achieved. For instance, a thin film extruder provided with an appropriate venting capability (e.g., vent ports) to remove volatiles can be selected. Such extruders can be provided with appropriate compression and decompression zones created by the screw flights through which the molten polymeric material is caused to pass. While present in at least a portion of the decompression zone, the molten polymer is provided in the relatively thin film thickness as previously discussed. Single or twin screw extruders can be selected. Such equipment is sometimes referred to as being a wiped-thin film reactor. Representative thin film extruders for carrying out the densification process of the present invention include Werner-Pfleiderer ZSK 28 mm. twin screw extruders, a C.W. Brabender ¾ inch single screw extruder, a MPM 1 inch single screw extruder, a 2.5 inch Egan single screw extruder, etc. Alternatively, the required densification satisfactorily can be carried out using a disk pack apparatus, such that manufactured by Farrel Company under the DISKPACK designation.

In accordance with the concept of the present invention it is essential for the pellet comprising the melt-processable thermotropic polymer to achieve a polymer density of at least 95 percent of the theoretical maximum (commonly expressed in gram/cc.), and preferably a pellet density of at least 99 percent of the theoretical maximum. The theoretical maximum density for the melt-processable thermotropic polymer may be determined through the examination of the polymer following solidification by use of a standard wide-angle X-ray technique. If the pellet includes a solid filler and/or reinforcing agent, the theoretical maximum density for the pellet is determined in accordance with a rule of mixtures calculation taking into consideration the relative quantities of polymeric and non-polymeric components present and the observed density of the solid filler and/or reinforcing agent. The actual polymer density for a given pellet sample conveniently may be determined by a volume displacement technique. One such method is to measure the change in volume of a fluid (such as isopropanol) upon addition of a weighed quantity of polymer pellets (e.g., 10 grams of polymer pellets may be used) to a predetermined volume of the fluid, 15 cc. of isopropanol may be used). The fluid can be contained in a measuring cylinder capable of volume measurements to at least 0.2 cc. The density of the polymer pellets may be computed from:

$$\text{Polymer Density} = \frac{\text{Weight of Pellets}}{\text{Change in volume of isopropanol}}$$

It has been found that the theoretical maximum for the polymer density of the melt-processable thermotropic polymer will vary somewhat with the nature of the moieties which make up the polymer chain. For instance, wholly aromatic polymer units tend to exhibit a slightly greater density than aliphatic units. At the conclusion of the densification treatment the pellet density for a pellet comprising solely the melt-processable thermotropic polymer commonly will be at least 1.35 gram/cc. (e.g., approximately 1.35 to 1.4 gram/cc.), and preferably at least 1.39 gram/cc. (e.g., approximately 1.39 to 1.40 gram/cc.).

Before or after the densification treatment of the melt-processable thermotropic polymer it may be blended to include a solid particulate filler (e.g., TiO$_2$ or calcium metasilicate) and/or a reinforcing agent (e.g., glass fibers) in a concentration of up to approximately 60 percent by weight (e.g., 5 to 50 percent by weight).

At the conclusion of the densification treatment the resulting densified polymer while molten and at a temperature below its threshold temperature for further polymerization is extruded into a quench zone followed by cutting of the extrudate to form pellets. Such extrusion and cutting to form pellets can be conducted by standard techniques known in the art. Commonly the extrusion orifice will be of a circular configuration having a diameter of approximately 0.125 to 0.25 inch. At the time of the extrusion the molten polymer commonly is provided at a temperature which exceeds the melting temperature by approximately 2° to 15° C. while taking care not to reach the threshold temperature for further polymerization and the generation of new volatiles. The extruded densified polymer commonly is subjected to a drawdown of about 1:1 to 3:1 prior to solidification. In a preferred embodiment of the present invention the melt-processable thermotropic polymer is provided at a temperature in the range of approximately 280° to 325° C. during the densification treatment and when extruded prior to quenching. The resulting extrudate commonly is quenched by passing into a liquid bath (e.g., a water bath) which is provided at a temperature below the melting temperature of the polymer (e.g., at approximately 10° to 100° C.). The resulting extrudate next is cut into improved pellets of appropriate length. If desired, a plurality of extrudates may be extruded and cut simultaneously, such as by the use of a Berstoff or similar pelletizer.

The cross-sectional shape of the resulting improved pellets of the present invention may be in any one of a variety of configurations. Such configuration preferably is such that the pellets are free-flowing so that they may be easily conveyed and handled. The pellet cross-section preferably is circular. The pellet product commonly has a width of approximately 0.0625 to 0.25 inch (e.g., 0.125 to 0.1875 inch), and a length of approximately 0.0625 to 0.25 inch (e.g., 0.125 to 0.1875 inch). In a particularly preferred embodiment the pellets possess a substantially cylindrical cross-sectional configuration and are approximately 0.125 inch in diameter and approximately 0.125 inch in length.

The improved molding pellets of the present invention can be melt-processed to form shaped articles having improved physical properties. For instance, improved three-dimensional molded articles, three-dimensional melt-extruded articles, and melt-extruded films and fibers can be formed from the same while using standard technology for the formation of such articles. During such melt-processing it is recommended that the molten polymer be maintained below the threshold temperature for further polymerization so as to avoid the generation of new volatile by-products as the result of a condensation polymerization reaction.

Shaped articles formed from the improved pellets of the present invention can be subjected to a heat treatment below the threshold temperature for further polymerization for an extended period of time in order to impart strength improvement while retaining improved surface characteristics. Such heat-strengthening is known in the art for articles formed of anisotropic melt-forming polymers and is described in U.S. Pat. Nos. 3,955,487; 4,183,895; 4,247,514, and elsewhere. In the prior art when molded three-dimensional articles of anisotropic melt-forming polymers are heat-treated there has been a propensity for additional surface roughness in the form of blemishes or small blisters to appear on the surface. The present invention provides effective technology to deal with this shaped article appearance problem of the prior art.

It has further been observed that molded articles of the present invention can better withstand extended usage at an elevated temperature (e.g., at 230° C. for 60 hours) while retaining the improved surface characteristics. In the prior art such usage at an elevated temperature would tend to routinely lead to significant surface roughness.

Accordingly, the present invention makes possible the formation of better quality shaped articles from a melt-processable thermotropic polymer. Not only is the article more uniformly dense across its cross-section, but the surface thereof is smoother (i.e., more glossy) and more aesthetically appealing. The effects of the increased pellet densities on the surface appearance of shaped articles formed therefrom have surprisingly been found to be dramatic.

The following examples are presented as specific illustrations of the claimed intention. It should be understood, however, that the invention is not limited to the specific details set forth in the examples.

EXAMPLE I

To a reactor of 50 gallon capacity equipped with an anchor stirrer, gas inlet tube, distillation head, and condenser were added the following:
 (a) 80.2 pounds of 6-acetoxy-2-naphthoic acid (158 moles),
 (b) 169.8 pounds of p-acetoxybenzoic acid (428 moles), and
 (c) 0.012 pound of potassium acetate catalyst.

The charged reactor was vacuum purged with nitrogen gas and was brought to a temperature of 190° C. over a period of 90 minutes. At this temperature the monomer reactants were provided as a melt and were stirred while under a slow stream of nitrogen gas. The reactants were next heated with stirring from 190° C. to 228° C. in 15 minutes, from 228° C. to 260° C. in 15 minutes, from 260° C. to 288° C. in 15 minutes, from 288° C. to 304° C. in 15 minutes, from 304° C. to 316° C. in 15 minutes, from 316° C. to 321° C. in 15 minutes, from 321° C. to 325° C. in 15 minutes, from 325° C. to 327° C. in 15 minutes, and were held at 327° C. for 16 minutes. During the course of the acidolysis polymerization reaction acetic acid was formed and was removed through the distillation head and condenser. After the resulting viscous polymer melt was held at a temperature of 327° C. for 16 minutes as indicated, the pressure was reduced to 12 mm. of mercury and the contents were next heated with stirring while at a temperature of approximately 327° C. for another 25 minutes.

The resulting wholly aromatic polyester was removed from the reactor by breaking the partial vacuum with nitrogen gas and forcing the molten polymer through a 3-hole die attached to the bottom of the reactor while under a pressure of 95 psi. The polymer was shaped into pellets by cooling the extruded strands in a water quench zone and chopping the strands with a Cumberland pelletizer.

The resulting pellets were found to possess an inherent viscosity (I.V.) of 5.42 dl./gram as determined in a pentafluorophenol solution of 0.1 percent by weight at 60° C. in accordance with the equation:

$$I.V. = \frac{\ln(\eta rel)}{c},$$

where c=concentration of the solution (0.1 percent by weight), and $\eta rel$=relative viscosity. The relative viscosity was measured by dividing the flow time in a capillary viscometer of the polymer solution by the flow time of the pure solvent.

When the wholly aromatic polyester of the resulting pellets was subjected to differential scanning calorimetry (DSC), it exhibited a sharp melting temperature at 275.9° C. The polymer melt was anisotropic. It was found that the wholly aromatic polyester possessed a threshold temperature for further polymerization of approximately 293° C. The resulting pellets also were found to exhibit a density of 1.29 gram/cc., while the maximum theoretical density was 1.40 gram/cc. Accordingly, these pellets which served as a starting material for the process of the present invention inherently exhibited a polymer density of only about 92 percent of the theoretical maximum. Had the partial vacuum not been applied during the final stages of the polymerization reaction for an extended period of time, it is anticipated that the polymer density of the starting material would have been even less.

In accordance with the concept of the present invention the wholly aromatic polyester was densified by use of a Werner-Pfleiderer 28 mm. twin screw extruder Model No. ZDSK which was vented by a Welch DUO-SEAL vacuum pump.

The compression zone of the screw had the following configuration:

| Flight No. | 1 | 2 | 3 | 4 | 5 | 6 | 7 |
|---|---|---|---|---|---|---|---|
| Flight Depth (mm.) | 1.8 | 2.8 | 2.8 | 2.8 | 1.8 | 1.8 | 1.8 |
| Pitch (degrees) | 15 | 45 | 45 | 45 | 30 | 30 | 15 |
| Flight Length (mm.) | 15 | 45 | 45 | 45 | 60 | 60 | 15, | where screw flight Nos. 2 to 4 represent the feed zone for the low density polymer pellets, screw flight Nos. 1 to 6 were right-handed sections and screw flight No. 7 was a left-handed section the purpose of which was to create a seal (or a dam) between the compression and decompression zones of the extruder screw.

The decompression zone of the screw had the following configuration:

| Flight No. | 8 | 9 | 10 | 11 | 12 | 13 | 14 | 15 | 16 | 17 |
|---|---|---|---|---|---|---|---|---|---|---|
| Flight Depth (mm.) | 1.8 | 1.8 | 2.8 | 2.8 | 2.8 | 1.8 | 1.8 | 1.8 | 1.8 | 1.8 |
| Pitch (degrees) | 30 | 24 | 45 | 45 | 45 | 24 | 24 | 30 | 30 | 15 |
| Flight Length (mm.) | 60 | 48 | 45 | 45 | 45 | 48 | 48 | 60 | 60 | 15, | where all the flights were right-handed sections. The vacuum port was located over flight Nos. 10 to 12 and the extrudate exited from the extruder after flight No. 17. Due to the placement of the left-handed section at flight No. 7, the entire screw between flight Nos. 8 to 17 could be subjected to a reduced pressure of 10 mm. of mercury.

While the wholly aromatic polyester was molten and at a temperature of 290° C., it was passed through the twin screw extruder. While passing through the decompression zones, the molten polymer was provided as a thin film of 1.8 to 2.8 mm. thickness and was subjected to a reduced pressure of 10 mm. of mercury. Residual volatiles inherently present in the wholly aromatic polyester were evolved and removed through the vent ports of the extruder. It can be calculated that the wholly aromatic polyester was subjected to the reduced pressure conditions while present as a thin film of 1.8 to 2.8 mm. thickness for approximately 2 minutes during which time it was advantageously densified.

The product of the densification treatment next was converted to an improved pellet form by use of a Hartig pelletizer. While molten at a temperature of 290° C., the polymer was extruded through two circular extrusion orifices each having diameters of 0.125 inch, was quenched in a water bath provided at 60° C., and was cut to form cylindrical pellets by the use of a Hartig cutter. The extruded densified polymer was subjected to a drawdown of approximately 1:1 prior to solidification in the quench zone which was controlled by the polymer feed rate and the pelletizer speed.

It was found that the resulting improved cylindrical pellets had a width of approximately 0.125 inch, a length of approximately 0.125 inch, and a density of 1.38 gram/cc. which is approximately 99 percent of the theoretical maximum of 1.4 gram/cc.

While molten and at temperatures of 280° C., 290° C., 295° C., 300° C. and 310° C., the improved pellets of the present invention next were injection-molded to form test specimens of 50 mm. diameter by use of Arburg 221E/150 equipment. The mold temperature was maintained at 100° C., the screw rotation was maintained at 250 rpm, the injection pressure was maintained at 8,000 psi, and overall cycle time per shot was 30 seconds.

For comparative purposes, Example I was repeated with the exception that the densification treatment of the present invention was not employed prior to the formation of the test specimens. The resulting molded products next were compared.

It was visually observed that the corresponding molded products formed from the pellets of the present invention surprisingly exhibited significantly better appearing surface characteristics. More specifically, the surfaces of such molded products tended to be significantly smoother and more uniform.

When the surface characteristics of the resulting molded test specimens were evaluated by use of the gloss test of ASTM D-2457 using a 45° scattering angle, the following gloss values (in percent) were achieved at the various molding temperatures:

|  | 280° C. | 290° C. | 295° C. | 300° C. | 310° C. |
|---|---|---|---|---|---|
| With the Polymer Densification Treatment of the Present Invention Prior to Molding | 66 | 62 | 63 | 61 | 55 |
| Without the Polymer Densification Prior to Molding (i.e., the Prior Art). | 57 | 58 | 57 | 56 | 37 |

The above gloss values which were objectively determined confirm the results of visual observations. It will be noted in each instance in which the injection-molding was carried out substantially above the threshold temperature for further polymerization that the appearance of the molded articles was diminished likely because of the significant generation of new volatiles during molding which influenced the surface appearance. However, in all instances the improved pellets of the present invention yielded an improved molded product for a given set of molding conditions.

EXAMPLE II

Example I was substantially repeated with the exceptions indicated.

To the reactor equipped with an anchor stirrer, gas inlet tube, distillation head, and condenser were added the following:

(a) 164.5 pounds of 6-acetoxy-2-naphthoic acid (334.3 moles),
(b) 46 pounds of p-acetoxyacetanilide (108 moles),
(c) 39.5 pounds of terephthalic acid (108 moles), and
(d) 0.049 pound of potassium acetate catalyst.

The charged reactor was vacuum purged with nitrogen and was brought to a temperature of 190° C. over a period of 85 minutes. The reactants were heated with stirring from 190° C. to 220° C. in 15 minutes, from 220° C. to 255° C. in 15 minutes, from 255° C. to 285° C. in 15 minutes, from 285° C. to 302° C. in 15 minutes, from 302° C. to 314° C. in 15 minutes, from 314° C. to 320° C. in 15 minutes, from 320° C. to 325° C. in 15 minutes, from 325° C. to 335° C. in 45 minutes, from 335° C. to 340° C. in 15 minutes, and were held at 340° C. for 30 minutes. The pressure was next reduced to 10 mm. of mercury and the contents were heated another 30 minutes while at 340° C.

The resulting poly(ester-amide) was removed from the reactor by breaking the partial vacuum with nitrogen gas and forcing the molten polymer through the die under 40 pounds pressure and was shaped into pellets as described in Example I.

The resulting pellets were found to possess an inherent viscosity of 3.6 dl./gram as determined in a pentafluorophenol solution of 0.1 percent by weight at 60° C. When the poly(ester-amide) was subjected to differential scanning calorimetry (DSC), it exhibited a sharp melting temperature at 278° C. The polymer melt was anisotropic. It was found that the poly(ester-amide) possessed a threshold temperature for further polymerization of approximately 298° C. The resulting pellets were found to exhibit a density of 1.23 gram/cc. while the maximum theoretical density was 1.4 gram/cc. Accordingly, these pellets which served as the starting material for the process of the present invention inherently exhibited a density of only about 88 percent of the theoretical maximum.

Following densification as described in Example I, the resulting pellets exhibited a density of 1.388 gram/cc. which was 99 percent of the theoretical maximum.

While molten and at temperatures of 290° C., 295° C., 300° C., 310° C. and 320° C., the improved pellets of the present invention were melt-extruded using a ¾ inch Brabender single screw extruder with no venting capability to form a cylindrical shaped rod having a diameter of approximately 70 mils. Prior to melt-extrusion, the poly(ester-amide) was provided in the molten state for a residence time of approximately 10 minutes. It was found that in all instances the extruded rods formed from the improved pellets of the present invention exhibited a smooth and attractive surface appearance. Also, it was found that the density of the extruded product remained constant at approximately 1.388 gram/cc. for each of the melt-extrusion temperatures employed.

For comparative purposes, Example II was repeated with the exception that the densification treatment of the present invention was not employed prior to the formation of the test specimens. It was observed that in all instances the resulting extruded rods exhibited a rough surface appearance and significantly lower densities of 1.24 gram/cc. or below with a marked drop in density being exhibited by the rod which was extruded at 320° C.

EXAMPLE III

Example I was repeated wherein the wholly aromatic polyester capable of forming an anisotropic melt was prepared by a similar technique and was blended with chopped glass fibers to form improved fiber-reinforced pellets in accordance with the present invention. The initially prepared pellets of relatively low density were blended with 30 percent by weight of the chopped glass fibers in the Werner-Pfleiderer ZDSK twin screw extruder while operating at a reduced pressure of less than 10 mm. of mercury. The glass fibers exhibited a density of 2.54 gram/cc., and the theoretical maximum density of the pellets was 1.61 gram/cc. The actual density of the pellets formed in accordance with the present invention was approximately 1.54 gram/cc. or approximately 96 percent of the theoretical maximum.

The resulting glass fiber reinforced pellets of the present invention were heated to 295° C. and were injection-molded using an Arburg 221E/150 injection-molding machine to form standard disks having a diameter of 2 inches. These disks were subjected to a hot air environment at 230° C. for 60 minutes, were cooled to ambient temperature, and their surface appearances were observed. It was observed that the disks exhibited smooth and attractive surface appearances.

For comparative purposes, Example III was repeated with the exception that the pressures applied in the Werner-Pfleiderer ZDSK twin screw extruder were considerably higher. In Comparative Run A, the pressure was approximately 760 mm. and the resulting pellets possessed a density of approximately 1.39 gram/cc. which was only 86 percent of the theoretical maximum. In Comparative Run B, the pressure was approximately 127 mm., and the resulting pellets possessed a density of approximately 1.47 gram/cc. which was only 91 percent of the theoretical maximum. Following subjection to the hot air environment at 230° C. for 60 minutes, it was observed that the disks of Comparative Runs A and B possessed surface imperfections and blistering.

EXAMPLE IV

Example III was repeated wherein the wholly aromatic polyester capable of forming an anisotropic melt was prepared by a technique similar to that of Example I and was blended with particulate calcium metasilicate (i.e., wollastonite to form improved filled pellets in accordance with the present invention. The initially prepared pellets of relatively low density were blended with 40 percent by weight of the particulate calcium metasilicate in the Werner-Pfleiderer ZDSK twin screw extruder while operating a reduced pressure of less than 10 mm. of mercury. The particulate calcium metasilicate exhibited a density of 2.9 gram/cc., and the theoretical maximum density for the pellets was 1.76 gram/cc. The actual density of the pellets formed in accordance with the present invention was approximately 1.69 gram/cc. or 96 percent of the theoretical maximum.

For comparative purposes, Example IV was repeated with the exception that the reduced pressures applied in the Werner-Pfleiderer ZDSK twin screw extruder were considerably higher. In Comparative Run A, the pressure was approximately 760 mm. of mercury, and the resulting pellets possessed a density of approximately 1.54 gram/cc. which was only 87.5 percent of the theoretical maximum. In Comparative Run B, the pressure was approximately 250 mm. of mercury, and the resulting pellets possessed a density of only 91.5 percent of the theoretical maximum. Following subjection to the hot air environment at 230° C. for 60 minutes, it was observed that the disks of Comparative Runs A and B possessed surface imperfections and blistering.

Although the invention has been described with preferred embodiments, it is to be understood that variations and modifications may be employed without departing from the concept of the invention as defined in the following claims:

I claim:

1. An improved process for producing pellets from a melt-processable thermotropic polymer which is capable of forming an anisotropic melt phase, which pellets are capable of undergoing melt-processing to form shaped articles having improved physical properties when compared to shaped articles prepared from conventionally prepared pellets which lack the densification treatment of the present invention, comprising:
    (a) subjecting said melt-processable polymer which is capable of forming an anisotropic melt phase while in the molten state at a temperature below the threshold temperature for further polymerization and present as a thin film in a thickness of no more than approximately 10 mm. to reduced pressure conditions of approximately 0 to 100 mm. of mercury whereby residual volatiles present therein are substantially evolved and removed from said molten polymer whereby said polymer is densified,
    (b) extruding said resulting densified polymer while molten and at a temperature below its threshold temperature for further polymerization into a quench zone, and
    (c) cutting the extrudate to form improved solid pellets therefrom having a pellet density of at least 95 percent of the theoretical maximum.

2. An improved process for producing pellets according to claim 1 wherein said melt-processable thermotropic polymer which is capable of forming an anisotropic melt phase is selected from the group consisting of wholly aromatic polyesters, aromatic-aliphatic polyesters, wholly aromatic poly(ester-amides), aromatic-aliphatic poly(ester-amides), aromatic polyester carbonates, and mixtures of the foregoing.

3. An improved process for producing pellets according to claim 1 wherein said melt-processable thermotropic polymer which is capable of forming an anisotropic melt phase is wholly aromatic in the sense that each moiety present contributes at least one aromatic ring.

4. An improved process for producing pellets according to claim 1 wherein said melt-processable thermotropic polymer which is capable of forming an anisotropic melt phase is a wholly aromatic polyester.

5. An improved process for producing pellets according to claim 1 wherein said melt-processable thermotropic polymer which is capable of forming an anisotropic melt phase is a wholly aromatic poly(ester-amide).

6. An improved process for producing pellets according to claim 1 wherein said melt-processable thermotropic polymer which is capable of forming an anisotropic melt phase includes not less than about 10 mole percent of recurring units which include a naphthalene moiety.

7. An improved process for producing pellets according to claim 1 wherein said melt-processable thermotropic polymer which is capable of forming an anisotropic melt phase includes not less than about 10 mole percent of recurring units which include a naphthalene moiety selected from the group consisting of 6-oxy-2-naphthoyl moiety, 2,6-dioxynaphthalene moiety, 2,6-dicarboxynaphthalene moiety, and mixtures of the foregoing.

8. An improved process for producing pellets according to claim 1 wherein said melt-processable thermotropic polymer which is capable of forming an anisotropic melt phase exhibits an inherent viscosity of approximately 0.8 to 15.0 dl./gm. when dissolved in a concentration of 0.1 percent by weight in pentafluorophenol at 60° C.

9. An improved process for producing pellets according to claim 1 wherein said melt-processable thermotropic polymer which is capable of forming an anisotropic melt phase is a wholly aromatic polyester which consists essentially of moieties I and II wherein:

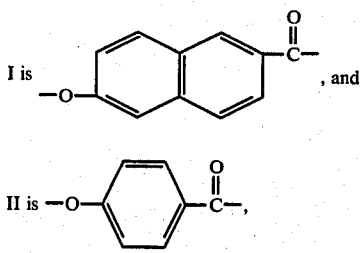

wherein said polyester comprises approximately 10 to 90 mole percent of moiety I, and approximately 10 of 90 mole percent of moiety II.

10. An improved process for producing pellets according to claim 1 wherein said melt-processable thermotropic polymer which is capable of forming an anisotropic melt phase is a wholly aromatic poly(ester-amide) which consists essentially of moieties I, II, III, and optionally IV, wherein in each instance Ar comprises at least one aromatic ring, and wherein:

I is

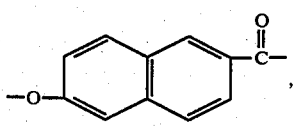

II is

III is —Y—Ar—Z— where Y is O, NH, or NR, and Z is NH or NR where R is an alkyl group of 1 to 6 carbon atoms or an aryl group, and IV is —O—Ar—O— wherein said poly(ester-amide) comprises approximately 10 to 90 mole percent of moiety I, approximately 5 to 45 mole percent of moiety II, approximately 5 to 45 mole percent of moiety III, and approximately 0 to 40 mole percent of moiety IV.

11. An improved process for producing pellets according to claim 1 wherein said melt-processable thermotropic polymer which is capable of forming an anisotropic melt phase was formed via an acidolysis-polymerization.

12. An improved process for producing pellets according to claim 1 wherein said melt-processable thermotropic polymer which is capable of forming an anisotropic melt phase was formed via a melt-polymerization technique.

13. An improved process for producing pellets according to claim 1 wherein said melt-processable thermotropic polymer which is capable of forming a anisotropic melt phase was formed via a slurry-polymerization technique.

14. An improved process for producing pellets according to claim 1 wherein said thin film thickness in step (a) is approximately 1 to 5 mm.

15. An improved process for producing pellets according to claim 1 wherein said reduced pressure conditions produce a partial vacuum on the surface of said thin film of approximately 0 to 60 mm. of mercury.

16. An improved process for producing pellets according to claim 1 wherein said step (a) is carried out in a thin film extruder.

17. An improved process for producing pellets according to claim 1 wherein said step (a) is carried out in a disk pack apparatus.

18. An improved process for producing pellets according to claim 1 wherein said melt-processable thermotropic polymer is provided in steps (a) and (b) at a temperature in the range of approximately 280° to 325° C. prior to quenching in step (b).

19. An improved process for producing pellets according to claim 1 wherein during said step (b) said extruded densified polymer is subjected to a drawdown of about 1:1 to 3:1 prior to solidification in said quench zone.

20. An improved process for producing pellets according to claim 1 wherein said resulting pellets possess a substantially cylindrical cross-sectional configuration.

21. An improved process for producing pellets according to claim 1 wherein the polymer density of said resulting improved solid pellets is at least 1.35 gram/cc.

22. An improved process for producing pellets according to claim 1 wherein the polymer density of said resulting improved solid pellets is approximately 1.35 to 1.4 gram/cc.

23. An improved process for producing improved solid pellets according to claim 1 wherein the polymer density of said resulting pellets is at least 1.39 gram/cc.

24. An improved process for producing pellets according to claim 1 wherein the polymer density of said resulting improved solid pellets is approximately 1.39 to 1.40 gram/cc.

25. An improved process for producing pellets according to claim 1 wherein the resulting pellets additionally include a solid particulate filler and/or reinforcing agent incorporated therein in a concentration of up to approximately 60 percent by weight.

26. An improved pellet comprising a melt-processable thermotropic polymer which is capable of forming an anisotropic melt phase and which pellet is capable of undergoing melt-processing to form shaped articles having improved physical properties when compared to shaped articles prepared from conventionally prepared pellets of lesser density, wherein said pellet has a width of approximately 0.0625 to 0.25 inch, a length of approximately 0.0625 to 0.25 inch, and a pellet density of at least 95 percent of theoretical maximum.

27. An improved pellet according to claim 26 wherein said melt-processable thermotropic polymer which is capable of forming an anisotropic melt phase is selected from the group consisting of wholly aromatic polyesters, aromatic-aliphatic polyesters, wholly aromatic poly(ester-amides), aromatic-aliphatic poly(ester-amides), aromatic polyester carbonates, and mixtures of the foregoing.

28. An improved pellet according to claim 26 wherein said melt-processable thermotropic polymer which is capable of forming an anisotropic melt phase is wholly aromatic in the sense that each moiety present contributes at least one aromatic ring.

29. An improved pellet according to claim 26 wherein said melt-processable thermotropic polymer which is capable of forming an anisotropic melt phase is a wholly aromatic polyester.

30. An improved pellet according to claim 26 wherein said melt-processable thermotropic polymer which is capable of forming an anisotropic melt phase is a wholly aromatic poly(ester-amide).

31. An improved pellet according to claim 26 wherein said melt-processable thermotropic polymer which is capable of forming an anisotropic melt phase includes not less than about 10 mole percent of recurring units which include a naphthalene moiety.

32. An improved pellet according to claim 26 wherein said melt-processable thermotropic polymer which is capable of forming an anisotropic melt phase includes not less than about 10 mole percent of recurring units which include a naphthalene moiety selected from the group consisting of 6-oxy-2-naphthoyl moiety, 2,6-dioxynaphthalene moiety, 2,6-dicarboxynaphthalene moiety, and mixtures of the foregoing.

33. An improved pellet according to claim 26 wherein said melt-processable thermotropic polymer which is capable of forming an anisotropic melt phase exhibits an inherent viscosity of approximately 0.8 to 15.0 dl./gm. when dissolved in a concentration of 0.1 percent by weight in pentafluorophenol at 60° C.

34. An improved pellet according to claim 26 wherein said melt-processable thermotropic polymer which is capable of forming an anisotropic melt phase is a wholly aromatic polyester which consists essentially of moieties I and II wherein:

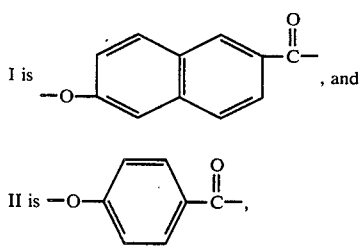

wherein said polyester comprises approximately 10 to 90 mole percent of moiety I, and approximately 10 of 90 mole percent of moiety II.

35. An improved pellet according to claim 26 wherein said melt-processable thermotropic polymer which is capable of forming an anisotropic melt phase is a wholly aromatic poly(ester-amide) which consists essentially of moieties I, II, III, and optionally IV, wherein in each instance Ar comprises at least one aromatic ring, and wherein I is

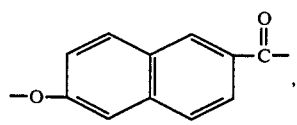

II is

III is —Y—Ar—Z— where Y is O, NH, or NR, and Z is NH or NR where R is an alkyl group of 1 to 6 carbon atoms or an aryl group, and IV is —O—Ar—O— wherein said poly(ester-amide) comprises approximately 10 to 90 mole percent of moiety I, approximately 5 to 45 mole percent of moiety II, approximately 5 to 45 mole percent of moiety III, and approximately 0 to 40 mole percent of moiety IV.

36. An improved pellet according to claim 26 wherein said pellet possesses a substantially cylindrical cross-sectional configuration.

37. An improved pellet according to claim 26 wherein said pellet possesses a substantially cylindrical cross-sectional configuration and is approximately 0.125 inch in diameter and approximately 0.125 inch in length.

38. An improved pellet according to claim 26 wherein the polymer density is at least 1.35 gram/cc.

39. An improved pellet according to claim 26 wherein the polymer density is approximately 1.35 to 1.4 gram/cc.

40. An improved pellet according to claim 26 wherein the polymer density is at least 1.39 gram/cc.

41. An improved pellet according to claim 26 wherein the polymer density is approximately 1.39 to 1.4 gram/cc.

42. An improved pellet according to claim 26 which additionally includes a solid particulate filler and/or reinforcing agent incorporated therein in a concentration of up to approximately 60 percent by weight.

* * * * *